Patented Jan. 17, 1928.

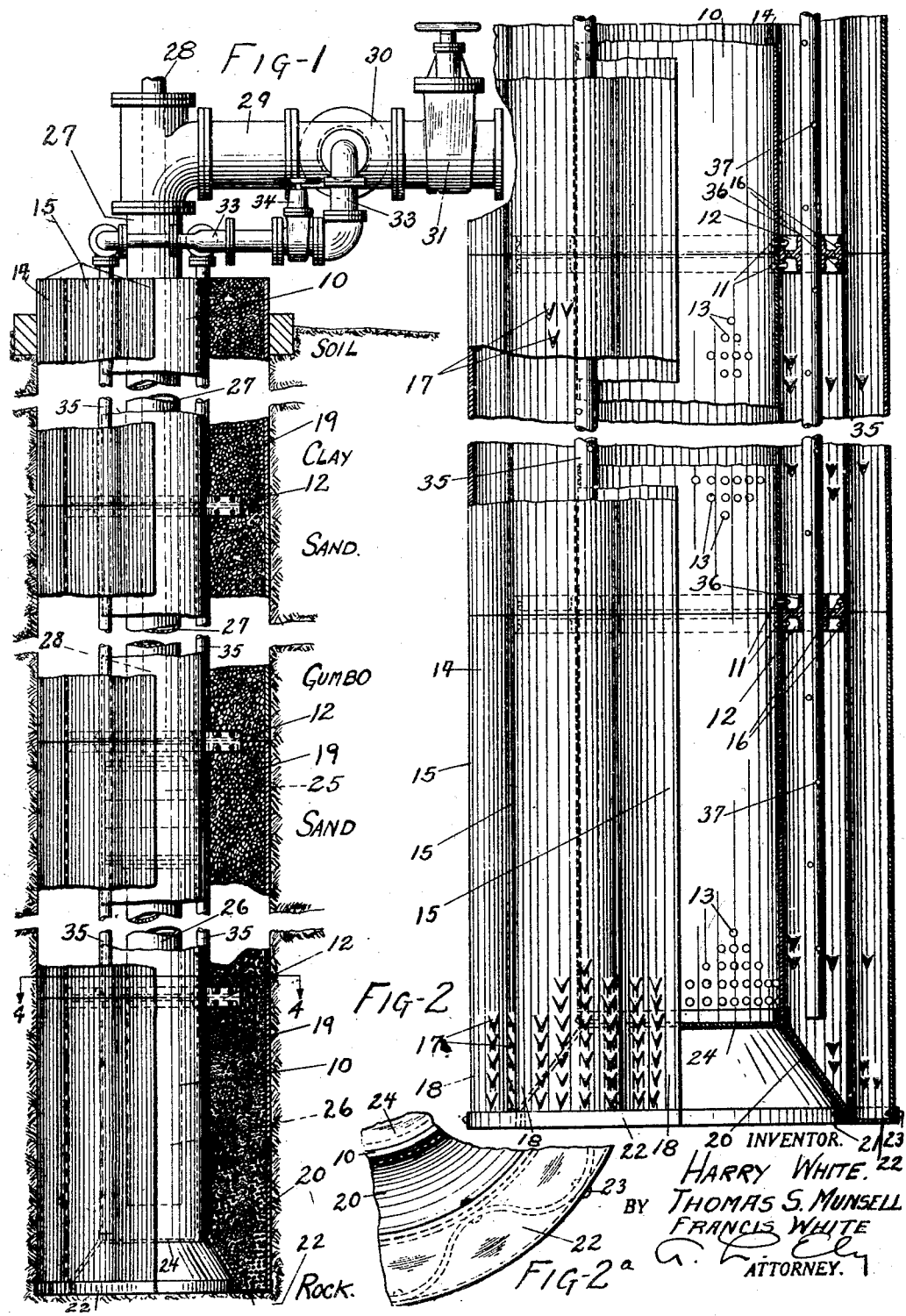

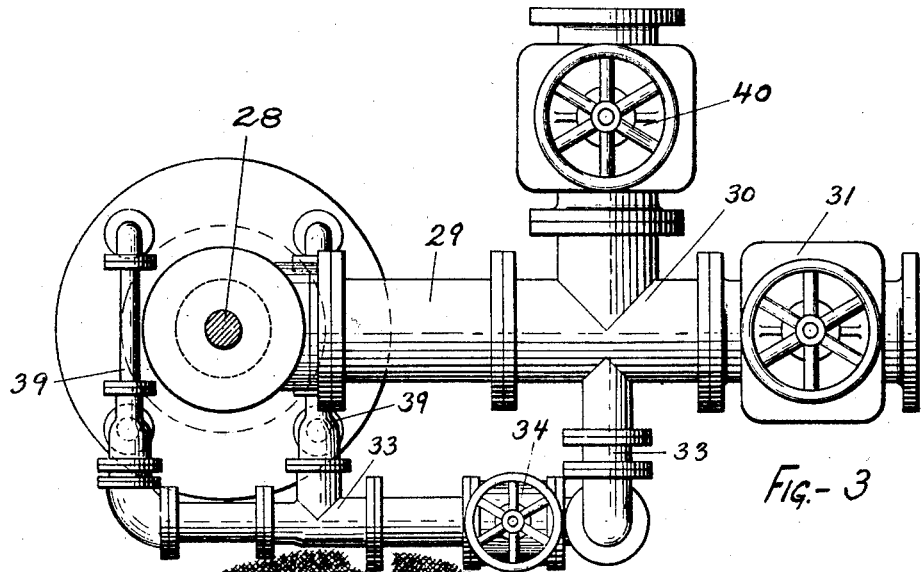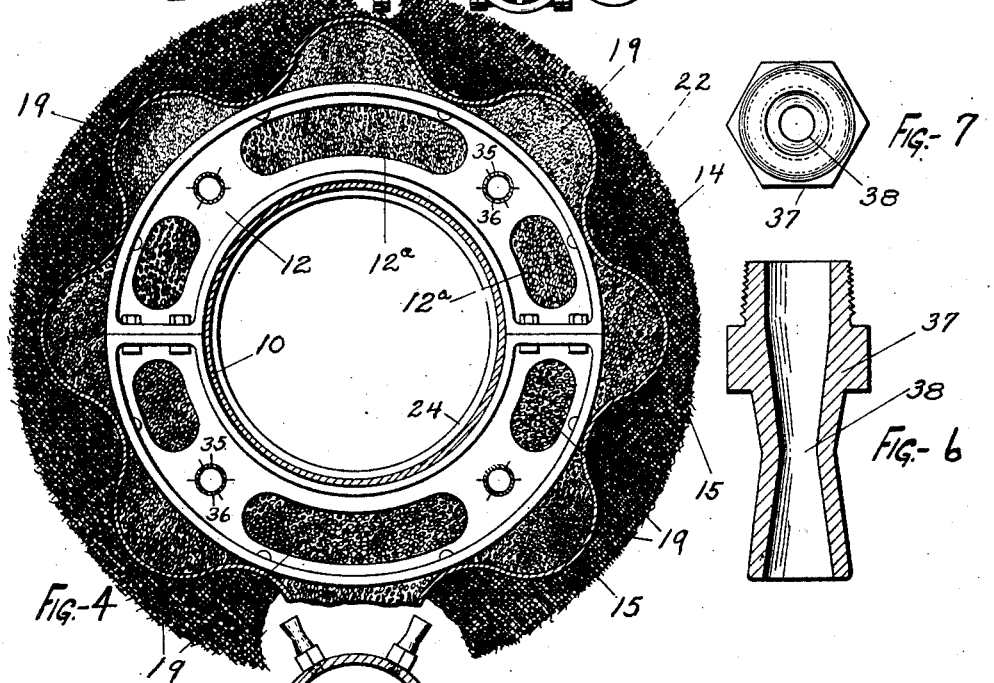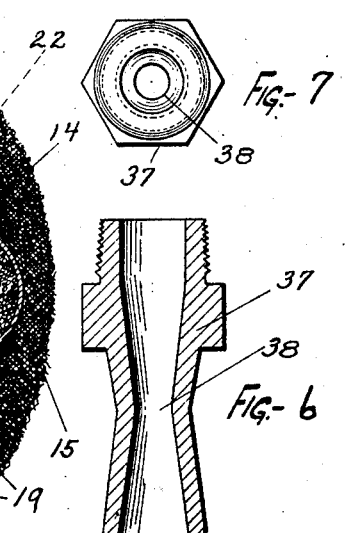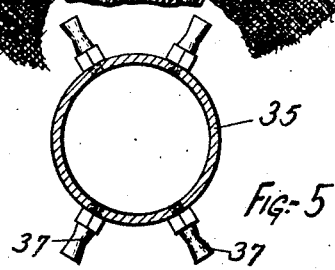

1,656,550

UNITED STATES PATENT OFFICE.

HARRY WHITE, FRANCIS WHITE, AND THOMAS S. MUNSELL, OF AKRON, OHIO, ASSIGNORS, BY DIRECT AND MESNE ASSIGNMENTS, TO FRANCIS WHITE AND HARRY WHITE, BOTH OF AKRON, OHIO.

WELL SCREEN.

Application filed November 3, 1924. Serial No. 747,436.

This invention relates to well screens such as are used in the construction of water wells and the like.

The object of the invention is to provide a screen structure which can easily be sunk into water bearing strata, which will be strong but light, which will have greater water capacity, which is provided with a screen having an improved type of perforation adapted to increase the capacity thereof, and which is provided with a cleaning device for periodically cleaning and agitating screening material supported therein or thereby.

Heretofore there has been employed, double-walled screens containing a screening material between its walls and the present invention is more specifically directed to this type of screen although many of its features are capable of being employed with other types of screens without sacrificing all of the benefits to be derived therefrom.

The invention will be better understood when the following detailed description thereof is read in connection with the accompanying drawings, it being understood that the drawings and description are for purposes of illustration and that the invention is not limited to the specific structure shown and described.

Of the accompanying drawings:

Figure 1 is a view partly in elevation, partly in section and partly broken away showing the well screen sunk through various water-bearing strata;

Figure 2 is a detail view partly in elevation and partly in section of the lower portion of the screen structure;

Figure 2ª is a detail plan of a portion of the bottom thereof;

Figure 3 is a plan view of the pipe connections shown at the top of Figure 1;

Figure 4 is a enlarged transverse section on line 4—4 of Figure 1;

Figure 5 is an enlarged transverse section of one of the cleaning pipes;

Figure 6 is a longitudinal section of one of the clean-nozzles; and

Figure 7 is an inner end elevation of the nozzle.

Referring to the drawings, 10 is an inner casing formed of a plurality of cylindrical sections secured together by being butted end to end and riveted, as indicated at 11, 11, (Figure 2) to spacer rings 12, 12 surrounding the casing. The sections 10 are provided with perforations 13, 13 for the passage of water into the interior of the casing. The ring 12 comprises two semicircular sections as illustrated in Figure 4 and is provided with openings 12ª, 12ª, for a purpose later explained.

Arranged in encircling relation to inner casing 10 is an outer casing 14 which is formed with vertical corrugations 15, 15 and also formed of a plurality of sections butted end to end and secured as by rivets 16, 16 to spacer rings 12. The casing 14 is provided with perforations 17, 17 of a special form. These perforations are formed by making a V-cut in the casing and punching the triangular piece of metal forming the V outwardly so as to provide a downwardly sloping baffle over the screen opening. For a purpose which will later be explained, the perforations are only made between the crests of the corrugations, the portions of the outer casing at or closely adjacent the crests being left imperforate as illustrated at 18, (Figure 2).

The casings 10 and 14 thus provide an annular space for the reception of a suitable screening or filtering material such as gravel indicated at 19. In order to support the column of screening material, an outwardly flared bottom section 20 is secured on the lower end of the lowermost section of casing 10, the lower periphery of section 20 being tangent to the troughs in the casing 14 so that it may be riveted thereto, as at 21 (Figure 2). To completely close off the lower end of the space between the casings an annular plate 22 is secured to the lower ends of section 20 and casing 14, the plate 22 being secured on its outer periphery to the crest portions of the casing 14 as at 23 (Figure 2 and 2ª). A suitable cutting shoe (not shown) such as is usually employed in the art may be secured on the outer periphery of plate 22. The interior of casing 10 is preferably closed off at the bottom by a circular plate 24 secured in the bottom thereof.

For removing water from the well a centrifugal pump 25 (indicated in dotted lines Figure 1) is mounted in a conventional manner in the casing 10, a suction pipe 26 being connected thereto so as to extend downwardly adjacent the bottom of the well, and a delivery pipe 27 being connected thereto for conducting water upwardly out of the well. A shaft 28 extends downwardly through pipe 27 for operation of pump 25, the shaft 28 being operated by any suitable power means.

Pipe 27 is connected to a pipe 29 leading to a cross-connection 30 to which is connected a main valve connection 31 for controlling the supply of water to the water main. Piping 33 is connected to another branch of cross-connection 30 and a valve 34 is connected in the line 33 for controlling the supply of water to the cleaning device of the invention.

The cleaning device comprises a number of pipes 35, 35 (in this instance four) carried downwardly between the casings 10 and 14, the pipes being supported in position by being extended through apertures 36, 36 in rings 12. Nozzles 37, 37 are connected onto pipes 36 so as to extend in various directions into the space between the casings (Figure 5). Each nozzle 37 is formed with a constricted mouth 38 whereby water will issue with considerable force therefrom. The pipes 35 are connected to piping 33 through suitable auxiliary headers 39, 39.

The fourth branch of cross-connection 30 is connected to a valve connection 40 for controlling the conduction of water to a waste pipe (not shown).

In the operation of sinking a well, the screen is forced downwardly, the soil, clay, sand, etc., cut out thereby being withdrawn upwardly through the interior of casing 10. Screening material 19 is filled into the space between the casings as the screen goes down, the weight of the gravel or the like being supported on the section 20 and bottom plate 22 and thus assisting in the sinking of the screen. Openings 12$^a$, 12$^a$ in rings 12 permit the gravel to fall therethrough to fill all of the space between the casings. Pipes 35, 35 are thus embedded in the gravel or other screening material.

Since the opening formed will be circular, the outer casing 14 will only engage the ground at the crest portions of the corrugations and as the operation of sinking proceeds, comparatively loose earth or other material through which the screen is driven will fill up the outer spaces or columns defined by the corrugations. In some cases, additional screening material may be placed in these outer spaces as the screen is driven into the ground but this is not essential to the successful operation of the screen.

When the sinking operation is finished the bottom of casing 10 is closed off by plate 24 which is passed downwardly into the casing 10 and secured in any suitable manner at the bottom thereof. The pump 25 is then installed and the various pipe connections made as will be understood.

In operation, the water from the various water-bearing strata will pass through the loose earth, gravel, etc., in the outer spaces between the crests of the corrugations, then through perforations in casing 14, through the screening material between casings 14 and 10 and finally through screen 10 into the interior thereof from which it will be pumped by the pump 35 into the water main, valve 31 being open and 34 and 40 normally closed. Due to the greater surface of casing 14 and the consequently greater number of perforations therein than could be provided in a circular casing, the capacity of the screen is greatly increased while the screening material is protected to a great extent by the casing and accordingly will not become clogged as rapidly as would an unprotected column of screening material.

In order to increase the capacity of the screen, the cleaning device may be periodically operated to loosen the screening material and force out particles of material tending to clog the same. This is accomplished by closing valve 31 and opening valve 34. Water pumped from the well will thus be forced down pipes 35 and out of nozzles 37 under great force. In this manner the screening material will be thoroughly agitated and dirt will be washed out of the same and also out of the screen perforations.

This dirty water will find its way into the well and can be pumped therefrom by closing valve 34 and opening valve 40. When the water again becomes clear, valve 31 will be opened and valve 40 closed so that the well will be again operating in a normal manner.

It will be noted that the pipes 35 serve as a bracing or strengthening means for the whole structure. Also due to the corrugated formation of the casing the friction of the latter with the ground will be reduced to a minimum and will be along vertical lines at the crests of the corrugations wherein there are no perforations tending to add to the friction and which would become clogged due to rubbing against the ground. Accordingly there will be no tendency for the screen to bind as it is driven downwardly.

By forming the perforations 17 in the manner described, the total area of the perforations will be much larger for any given size of casing than that of a screen the perforations of which are straight slits extending either horizontally or vertically as have been prior art practises. This also greatly increases the capacity of the screen.

Modications of the invention may be resorted to without departing from the spirit thereof or the scope of the appended claims.

What is claimed is:

1. In combination, a well, a liquid discharge pipe therefrom, means for forcing discharge of liquid through said discharge pipe, a normally open valve for the discharge pipe, a wash line for the well having its upper end connected to the discharge pipe at a point betwen the inlet end of the latter and said valve, and a normally closed valve for said wash line adapted to be opened when the dicharge pipe valve is totally or partially closed, whereby to force liquid through said wash line into the well.

2. In combination, a well having a perforated liner, a liquid discharge pipe within said liner, means for forcing discharge of liquid through said discharge pipe, a normally open valve for said discharge pipe, a wash line for the well disposed at the outer side of said liner and connected at its upper end with said discharge pipe at a point between the inlet end of the latter and said valve, and a normally closed valve for said wash line adapted to be opened when the discharge pipe valve is totally or partially closed, whereby to force liquid through said wash line into the well.

3. In a well, a screen structure, a wall of granular screening material confined by said screen structure, spray pipes embedded in the screening material, and means for forcing water out of said spray pipes into said material in all directions to loosen the same and to clean foreign matter therefrom.

4. In a well, a screen structure, a wall of granular screening material confined by said structure, and a spray pipe embedded therein and adapted to direct a fluid into said material in all directions to thoroughly agitate the same.

5. In a well, a screen structure, a wall of granular screening material confined by said structure, and means embedded in said wall for periodically agitating and loosening said material by fluid under pressure forced in all directions through said wall.

6. In a well, a screen structure, a wall of granular screening material confined by said structure, means for pumping water from the well, a main header for normally receiving the water, an auxiliary header adapted to be periodically supplied from the pump, and means in said wall connected to the auxiliary header for forcing water into and through the wall of screening material in all directions to agitate and clean the same.

7. In a well, a screen structure, a wall of granular screening material confined by said structure, means for pumping water from the well, a main header for normally receiving the water, a valve between the main header and the pump, an auxiliary header adapted to be periodically connected to the pump, means embedded in the wall of screening material and connected to the auxiliary header to supply fluid in all directions in said wall, a valve between the auxiliary header and the pump, a waste outlet adapted to be placed in communication with the pump, and a valve between the waste outlet and the pump.

8. In a well, a screen structure, a wall of granular screening material confined by said structure, means for forcing water into and through the wall in all directions to agitate and wash the material, and means in said wall for removing said water from the well and conducting it to a waste outlet.

HARRY WHITE.
FRANCIS WHITE.
THOMAS S. MUNSELL.